United States Patent Office 2,838,544
Patented June 10, 1958

2,838,544

6α-FLUORO-16α-HYDROXY PROGESTERONES

John C. Babcock, Portage Township, Kalamazoo County, and J Allan Campbell and John A. Hogg, Kalamazoo Township, Kalamazoo County, and Oldrich K. Sebek, Kalamazoo, Mich., assignors to The Upjohn Company, Kalamazoo, Mich., a corporation of Michigan No Drawing. Application February 19, 1958
Serial No. 716,003

5 Claims. (Cl. 260—397.45)

The present invention relates to steroid compounds and is more particularly concerned with 6α-fluoro-11β,16α-dihydroxy-4-pregnene-3,20-dione (6α - fluoro-11β,16α-dihydroxyprogesterone), 6α-fluoro-16α-hydroxy - 4 - pregnene-3,11,20-trione (6α - fluoro-16α-hydroxy-11-ketoprogesterone), 16-acylates thereof, and a process for the production thereof.

The new compounds and the process of the present invention are illustratively represented by the following formulae:

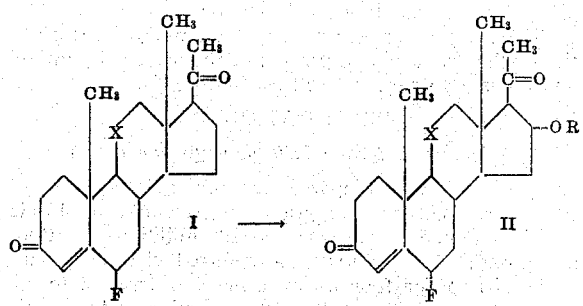

wherein X is selected from the group consisting of the carbonyl radical (>C=O) and the β-hydroxymethylene radical

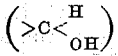

and R is selected from the group consisting of hydrogen and the acyl radical of an organic carboxylic acid, preferably a hydrocarbon carboxylic acid containing from one to twelve carbon atoms, inclusive.

It is an object of the instant invention to provide 11-oxygenated 6α-fluoro-16α-hydroxyprogesterones and the 16-acylates thereof, wherein the 11-oxygen substituent is keto or 11β-hydroxy and the acyl radical is that of hydrocarbon carboxylic acid containing from one to twelve carbon atoms, inclusive. It is another object of the instant invention to provide a process for the production of 11-oxygenated 6α-fluoro-16α-hydroxyprogesterones and the 16-acylates thereof. An additional object of the instant invention is to provide 6α-fluoro-11β,16α-dihydroxyprogesterone and 6α-fluoro-16α-hydroxy-11-ketoprogesterone, and the 16-acylates thereof. Other objects will be apparent to those skilled in the art to which this invention pertains.

The compounds of this invention possess valuable glucocorticoid and anti-inflammatory activities while having advantageous diuretic activity and salt-losing properties and are therefore particularly useful for systemic treatment of arthritic and allergic conditions. These compounds are also useful in the treatment of inflammatory conditions of the skin, eyes and ears of humans and of valuable domestic animals, as well as contact dermatitis and other allergic reactions. Compositions containing the compounds of the present invention can be prepared for human or animal use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products. The novel compounds can also be administered topically in the form of ointments, creams, lotions and the like, with or without co-acting antibiotics, germicides, or other materials forming advantageous combinations therewith.

The starting compounds of the instant invention are 11-oxygenated 6α-fluoroprogesterones, wherein the 11-oxygen substituent is keto or β-hydroxy, prepared as shown in Preparations 1 to 12, inclusive. The process of the present invention comprises subjecting the said 11-oxygenated 6α-fluoroprogesterone (I) to microbiological hydroxylation to obtain the corresponding 11-oxygenated 6α-fluoro-16α-hydroxyprogesterone (II), then if desired, treating the thus obtained 11-oxygenated 6α-fluoro-16α-hydroxyprogesterone with an acylating agent such as the acid halide or anhydride of a hydrocarbon carboxylic acid containing from one to twelve carbon atoms, inclusive, to obtain the corresponding 11-oxygenated 6α-fluoro-16α-hydroxyprogesterone 16-acylate.

In the bioconversion step of the present invention, the operational conditions and reaction procedure and details may be those already known in the art of steroid bioconversion as illustrated by the Murray et al. U. S. Patent 2,602,769, issued July 8, 1952, utilizing, however, the action of an organism of the genus Streptomyces. Among the species which are useful in the fermentation step of the present invention are *Streptomyces roseochromogenus* (Waksman collection 3689), *Streptomyces sp.* (A. T. C. C. 11009), and *Streptomyces roseochromogenus* (A. T. C. C. 3347).

The selected species of actinomycete is grown on a medium suitably containing assimilable non-steroidal carbon, illustratively carbohydrates, such as dextrose; assimilable nitrogen, illustratively soluble or insoluble proteins, peptones or amino acids; and mineral constituents, illustratively sodium or ammonium phosphate and magnesium sulfate. The medium may desirably have a pH before inoculation of between about 6.5 to about 7.8 though a higher or lower pH may be used. A pH of between about 6.8 and about 7.4 is preferred for the growth of actinomycetes and a temperature range from about 20 to about 35 degrees centigrade with about 20 to 32 degrees centigrade preferred.

The growth period required before the steroid to be bioconverted is exposed to the actinomycete does not appear to be critical, for example, the steroid may be added either before sterilization of the medium, at the time of inoculating the medium or at some time, for example, 24 or 48 hours later. The addition of steroid substrate to be fermented may be accomplished in any suitable manner, such as by dispersing the steroid substrate, either alone with a dispersing agent, or in solution in an organic solvent. Either submerged or surface culture procedures may be used with facility, although submerged culture is preferred.

The temperature during the period of the steroid bioconversion may be the same as that found suitable for the growth of the organism. It need be maintained only within such range as supports life, active growth, or the enzyme activity of the streptomycete.

The time required for the transformation of steroid varies somewhat with the procedure. When the steroid is added to the actinomycete after substantial growth of the organism, for example, after sixteen to 24 hours at optimum temperature, the conversion of steroid substrate begins immediately and is substantially complete in from two to ten days, five days being generally satisfactory, After completion of the steroid fermentation, the resulting transformed steroid is recovered from the fermentation reaction mixture by extracting the fermentation reaction mixture, including the fermentation liquor and mycelium with an organic solvent for steroids, for example, methyl isopropyl ketone, methylene chloride, chloroform, carbon tetrachloride, ethylene chloride, trichloroethylene, ether, amyl acetate, benzene, and the like. The fermentation liquor and mycelium may be separated and then separately extracted with suitable solvents. The extracts can be combined, either before or after washing with an alkaline solution, illustratively sodium bicarbonate, suitably dried, as for example, over anhydrous sodium sulfate, and the resulting purified transformed steroid obtained by recrystallization from organic solvents, by trituration or by chromatography in order to isolate the thus obtained steroid from the other fermentation products.

Subjecting 6α-fluoro-11β-hydroxyprogesterone to the above transformation procedure is productive of 6α-fluoro-11β,16α-dihydroxyprogesterone. Similarly, 6α-fluoro-16α-hydroxy-11-ketoprogesterone is obtained from 6α-fluoro-11-ketoprogesterone by the above transformation procedure.

Esterification of the 11-oxygenated 6α-fluoro-16α-hydroxyprogesterone to produce the corresponding 16-acyloxy compound can be performed under esterification conditions known in the art, e. g, by the reaction of the 16α-hydroxysteroid with an acylating agent such as an acid anhydride, acid chloride or bromide, or a ketene of a hydrocarbon carboxylic acid, or by reaction with the selected acid in the presence of an esterification catalyst, or with an ester under ester exchange reaction conditions. Reaction conditions which are apt to affect a labile 11β-hydroxy group should be avoided. Compounds thus produced include the 21-acyloxy compounds (II) wherein the acyl radical is that of an organic carboxylic acid, preferably a hydrocarbon carboxylic acid containing from one to twelve carbon atoms inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6 - trimethylbenzoic, 2,4,6 - triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc. Use of an excess of acylating reagent in the reaction is preferred unless conditions are such that an 11β-hydroxy group tends to be esterified. The 11β-hydroxy group is not esterified under normal acylation conditions. Solvents which are frequently employed in carrying out the acylating process include benzene, toluene, acetic acid, pyridine, and the like. Preferably the acylation is carried out at about room temperature or somewhat above to minimize decomposition of the starting steroid or product, although higher and lower temperatures, e. g., from about zero degrees centigrade to the boiling point of the reaction mixture may also be used. Isolation of the 16-acylated product is conveniently achieved by adding a large volume of water to the reaction mixture if the reaction solvent is water miscible and thus precipitating the product, or if the solvent is water immiscible by distilling the solvent from the reaction mixture at reduced pressure to leave a residue consisting essentially of the desired product.

Alternatively, 6α-fluoro-16α-hydroxy-4-pregnene-3,11,-20-trione and the 16-acylates thereof can be obtained from 6α-fluoro-11β,16α-dihydroxy-4-pregnene-3,20-dione 16-acylate by oxidation of the 11-hydroxyl group with an oxidizing agent to a keto group followed if desired by hydrolysis of the 16-acylate with, for example, an alkali metal base. Oxidizing agents such as chromic acid, potassium dichromate, a haloamide, and the like are operative. The oxidation can be carried out by a variety of methods, such as, for example, by oxidizing the said 6-fluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfate for N-bromoacetamide, N-bromosuccinimide and other N-haloacylamides and imides. Thereafter, the resulting 6α-fluoro-16α-hydroxy-4-pregnene-3,11,20-trione 16-acylate is recovered by conventional means, such as by dilution with water and extraction with water immiscible solvents, e. g., methylene chloride, ether, benzene, toluene, or the like. Treating the thus obtained 6α-fluoro-16α-hydroxy-4-pregnene-3,11,-20-trione 16-acylate with, for example, one to four equivalents of sodium or potassium hydroxide in aqueous methanol, ethanol, dioxane, or the like, is productive of 6α-fluoro-16α-hydroxy-4-pregnene-3,11,20 - trione which can be recovered by conventional means, such as those given for the oxidation product above.

The following preparations and examples are illustrative of the products and process of the present invention, and are not to be construed as limiting.

PREPARATION 1

*11-ketoprogesterone 3,20-bis-(ethylene ketal)*

A solution was prepared containing 100 grams of 11-ketoprogesterone, five grams of para-toluenesulfonic acid in 1.1 liters of benzene and 200 milliliters of ethylene glycol. This solution was refluxed vigorously with rapid stirring for four hours, using a water trap to remove the water formed in the reaction. After this period of reflux, the solution was cooled and washed with five percent aqueous sodium bicarbonate, then water, and dried over sodium sulfate. The solvents were removed by distillation and hot ethyl acetate was added. The ethyl acetate solution was chilled, diluted with ether, and filtered to give 68.7 grams of 11-ketoprogesterone 3,20-bis-(ethylene ketal), melting at 170 to 175 degrees centigrade.

PREPARATION 2

*11β-hydroxyprogesterone 3,20-bis-(ethylene ketal)*

In the same manner shown in Example 1, treating 11β-hydroxyprogesterone in benzene with ethylene glycol and paratoluenesulfonic acid is productive of 11β-hydroxyprogesterone 3,20-bis-(ethylene ketal).

Alternatively, 11-ketoprogesterone 3,20-bis-(ethylene ketal) is treated with excess lithium aluminum hydride in ether solution for one hour at room temperature, the excess lithium aluminum hydride is destroyed by addition of water, or ethyl acetate followed by water, and the ether solution is separated, washed with water, and evaporated to give 11β-hydroxyprogesterone 3,20-bis-(ethylene ketal).

PREPARATION 3

*5α,6α-oxidopregnane-3,11,20-trione 3,20-bis-(ethylene ketal)*

To a suspension of ten grams of anhydrous sodium acetate in 100 milliliters of forty percent peracetic acid, cooled in an ice bath, was added a solution of fifty grams of 11-ketoprogesterone 3,20-bis (ethylene ketal) in 700 milliliters of chloroform. The heterogeneous mixture was stirred vigorously for two and one-half hours at ice bath temperature, the mixture was washed with water, five percent aqueous sodium hydroxide, and water, and then dried with magnesium sulfate, filtered, and evaporated to dryness under reduced pressure to give a white solid residue which was boiled with about 500 milliliters of methanol and cooled. The thus obtained precipitate was collected by filtration and recrystallized from ethyl acetate to give 31.2 grams of 5α,6α-oxidopregnane-3,11,20-trione 3,20-bis-(ethylene ketal) of melting point 208 to 214 degrees centigrade.

PREPARATION 4

*5α,6α-oxido-11β-hydroxypregnane-3,20-dione 3,20-bis-(ethylene ketal)*

In the same manner as shown in Preparation 3, treating 11β-hydroxypregnane-3,20-dione 3,20-bis-(ethylene ketal) in chloroform solution with peracetic acid and sodium acetate is productive of 5α,6α-oxido-11β-hydroxypregnane-3,20-dione 3,20-bis-(ethylene ketal).

PREPARATION 5

*5α-hydroxy-6β-fluoropregnane-3,11,20-trione 3,20-bis-(ethylene ketal)*

To a stirred mixture of 56 grams of potassium bifluoride, fifteen milliliters of acetic anhydride and 210 milliliters of acetic acid was added thirty grams of 5α,6α-oxidopregnane-3,11,20-trione 3,20-bis-(ethylene ketal). The reaction mixture was stirred two days at room temperature, then methylene chloride was added and the solution was washed three times with water. The thus obtained methylene chloride solution was evaporated to dryness and the residue chromatographed through a 500-gram column of synthetic magnesium silicate. Fractions eluted with two and three percent acetone in Skellysolve B hexanes were combined and rechromatographed through a 300-gram column of synthetic magnesium silicate to give 4.10 grams of fractions eluted with two percent and three percent acetone in Skellysolve B hexanes. The thus obtained combined fractions were recrystallized from methanol containing a trace of pyridine to give 3.3 grams of 5α-hydroxy-6β-fluoropregnane-3,11,20-trione 3,20-bis-(ethylene ketal), having a melting point of 138 to 142 degrees centigrade, and the analysis:

Analysis.—Calculated for $C_{25}H_{37}FO_6$: C, 66.35; H, 8.24; F, 4.20. Found: C, 66.34; H, 8.32; F, 4.24.

PREPARATION 6

*5α,11β-dihydroxy-6β-fluoropregnane-3,20-dione 3,20-bis-(ethylene ketal)*

To a solution of one gram of 5α-hydroxy-6β-fluoropregnane-3,11,20-trione 3,20-bis-(ethylene ketal) in 100 milliliters of ether at room temperature was added 0.3 gram of lithium aluminum hydride with stirring. After 1.25 hours, ethyl acetate and more ether was added. Ice was then added slowly until the inorganic precipitate coagulated. The organic layer was decanted and washed three times with water, dried over magnesium sulfate, filtered and concentrated to dryness, giving a residue of 5α,11β-dihydroxy-6β-fluoropregnane-3,20-dione 3,20-bis-(ethylene ketal). Infrared analysis of the thus obtained crude product showed the presence of hydroxyl and ketal bonds and the absence of ketone bonds. The crude product was used without purification in the next step.

Alternatively, 5α,11β-dihydroxy-6β-fluoropregnane-3,20-dione 3,20-bis-(ethylene ketal) is obtained by treating 5α,6α-oxido-11β-hydroxypregnane-3,20-dione 3,20-bis-(ethylene ketal), in the same manner as shown in Preparation 5, with potassium bifluoride, acetic acid and acetic anhydride for two days at room temperature, then isolating the thus produced 5α,11β-dihydroxy-6β-fluoropregnane-3,20-dione 3,20-bis-(ethylene ketal) by methylene chloride extraction and chromatographic separation.

PREPARATION 7

*5α,11β-dihydroxy-6β-fluoropregnane-3,20-dione*

A solution of one gram of crude 5α,11β-dihydroxy-6β-fluoropregnane-3,20-dione 3,20-bis-(ethylene ketal) in a mixture of thirty milliliters of methanol and 2.5 milliliters of one normal aqueous sulfuric acid was boiled for thirty minutes, then concentrated to give 0.6 gram of 5α,11β-dihydroxy-6β-fluoropregnane-3,20-dione as crystals melting at 240 to 255 degrees centigrade, and a second crop of 0.1 gram. The two crops were combined and crystallized from methanol to give 0.4 gram of 5α,11β-dihydroxy-6β-fluoropregnane-3,20-dione having a melting point of 266 to 269 degrees centigrade, $[\alpha]_D$ plus 84 degrees (95 percent ethanol) and the following analysis:

Analysis.—Calculated for $C_{21}H_{31}FO_4$: C, 68.82; H, 8.53; F, 5.18. Found: C, 68.70; H, 8.88; F, 5.31.

PREPARATION 8

*6β-fluoro-11β-hydroxyprogesterone*

To a slurry of 200 milligrams of 5α,11β-dihydroxy-6β-fluoropregnane-3,20-dione in forty milliliters of 95 percent ethanol was added two milliliters of one normal aqueous sodium hydroxide. The reaction mixture was stirred at room temperature for seven hours. The solution was clear after two hours, and after seven hours, two drops of acetic acid was added and the reaction mixture concentrated under diminished pressure to about three milliliters. One milliliter of water was added, resulting in crystallization. The crystals were collected by filtration, washed with alcohol-water mixture, dried and recrystallized from a mixture of acetone-Skellysolve B hexanes to give 6β-fluoro-11β-hydroxyprogesterone of melting point 191 to 196 degrees centigrade, $[\alpha]_D$ plus 121 degrees (chloroform), $a_M$ 11,600 at 234 millimicrons in 95 percent alcohol, and having the following analysis:

Analysis.—Calculated for $C_{21}H_{29}FO_3$: C, 72.38; H, 8.39; F, 5.45. Found: C, 72.73; H, 8.49; F, 5.29.

PREPARATION 9

*6α-fluoro-11β-hydroxyprogesterone*

A slurry of 350 milligrams of 5α,11β-dihydroxy-6β-fluoropregnane-3,20-dione with 35 milliliters of chloroform was cooled in an ice-salt bath and saturated with hydrogen chloride gas. The steroid required about five minutes to dissolve. After thirty minutes a fast stream of nitrogen was passed through the reaction mixture, removing most of the hydrogen chloride. The solution was washed three times with water, dried over magnesium sulfate, filtered, and concentrated to dryness. The thus obtained residue was crystallized from an acetone-Skellysolve B hexanes mixture and gave two crops of crystals, a first crop of 0.2 gram with a melting point of 173 to 177 degrees centigrade and a second crop of 0.1 gram with a melting point of 176 to 178 degrees centigrade. The two crops were combined and recrystallized from a mixture of acetone and Skellysolve B hexanes to give 6α-fluoro-11β-hydroxyprogesterone having a melting point of 181 to 183 degrees centigrade, $[\alpha]_D$ plus 194 degrees (chloroform), $a_M$ 15,075 at 237 millimicrons in 95 percent alcohol, and the following analysis:

Analysis.—Calculated for $C_{21}H_{29}FO_3$: C, 72.38; H, 8.39; F, 5.49. Found: C, 72.05; H, 8.90; F, 4.86.

Alternatively, treating a solution of 6β-fluoro-11β-hydroxyprogesterone in chloroform with hydrogen chloride gas, in the manner described above, is productive of 6α-fluoro-11β-hydroxyprogesterone.

PREPARATION 10

*5α-hydroxy-6β-fluoropregnane-3,11,20-trione*

A mixture of eighty grams of potassium bifluoride in 500 milliliters of acetic acid was stirred until it had nearly dissolved. Sixty grams of 5α,6α-oxidopregnane-3,11,20-trione 3,20-bis-(ethylene ketal) was then added and the reaction mixture stirred for eighteen hours at room temperature, followed by dilution was 700 milliliters of methylene chloride, washing three times with water, drying over magnesium sulfate, filtering, and concentrating to dryness to give an oily residue. The thus obtained residue was dissolved in 200 milliliters of 95 percent alcohol, and forty milliliters of one normal aqueous sulfuric acid was added. The solution was warmed on the steam bath for one and one-half hours and diluted with sixty milliliters of water to give a precipitate of 5α-hydroxy-6β-fluoro-pregnane-3,11,20-trione. The precipitate was collected by filtration from the still warm solution, washed with about twenty milliliters of 1:1 ethanol-water mixture and dried to give 12.8 grams of crystals having a melting point of 271 to 273 degrees centigrade, $[\alpha]_D$ plus 103 degrees in pyridine, and the following analysis:

Analysis.—Calculated for $C_{21}H_{29}O_4F$: C, 69.20; H, 8.02; F, 5.21. Found: C, 69.48; H, 8.25; F, 4.54.

PREPARATION 11

6β-fluoro-11-ketoprogesterone

To a solution of 13.5 grams of 5α-hydroxy-6β-fluoro-pregnane-3,11,20-trione in 170 milliliters of pyridine was added 13.5 grams of N-bromoacetamide at room temperature. The reaction mixture was allowed to stand forty to fifty minutes, and then was cooled in an ice bath while a stream of sulfur dioxide gas was passed over the surface of the solution. After 22.5 grams of sulfur dioxide had been absorbed, the solution was stored at room temperature for one and one-quarter hours. The solution was again cooled with an ice bath and diluted with 450 milliliters of ten percent aqueous sulfuric acid. The solution was next saturated with salt and extracted three times with methylene chloride. The methylene chloride extracts were combined and washed once with dilute aqueous sulfuric acid and twice with water, then dried and evaporated to dryness. The thus obtained residue was recrystallized from ethyl acetate to give 8.15 grams of 6β-fluoro-11-ketoprogesterone having a melting point of 181 to 183.5 degrees centigrade, $[\alpha]_D$ plus 151 degrees in chloroform, $a_M$ 13,200 at 228 millicrons in 95 percent ethanol, and the following analysis:

Analysis.—Calculated for $C_{21}H_{27}FO_3$: C, 72.80; H, 7.86; F, 5.48. Found: C, 72.69; H, 8.09; F, 5.55.

PREPARATION 12

6α-fluoro-11-ketoprogesterone

A solution of one gram of 6β-fluoro-11-ketoprogesterone in ten milliliters of chloroform was cooled in an ice bath and saturated with hydrogen chloride gas. The reaction mixture was allowed to stand twenty minutes, and nitrogen was then bubbled through the mixture to remove most of the hydrogen chloride. The chloroform solution was next washed with water, dilute aqueous sodium bicarbonate, and brine, and then dried and evaporated to dryness. The thus obtained residue was crystallized first from methanol, then from ethyl acetate, to give 0.3 gram of 6α-fluoro-11-ketoprogesterone having a melting point of 184 to 187 degrees centigrade, $[\alpha]_D$ plus 248 degrees in chloroform, $a_M$ 14,675 at 223 millimicrons in 95 percent ethanol, and the following analysis:

Analysis.—Calculated for $C_{21}H_{27}FO_3$: C, 72.80; H, 7.86; F, 5.48. Found: C, 72.76; H, 7.86; F, 5.70.

Alternatively, treating a solution of 0.5 gram of 6α-fluoro-11β-hydroxyprogesterone dissolved in 30 milliliters of acetic acid at room temperature with a solution of 0.15 gram of chromium trioxide in 0.5 milliliter of water for thirty minutes, destroying the excess chromium trioxide with methanol, diluting the reaction mixture with water, extracting with methylene chloride and evaporating the methylene chloride solution to dryness, followed by crystallizing the residue from methanol, is productive of 6α-fluoro-11-ketoprogesterone.

EXAMPLE 1

6α - fluoro - 11β,16α - dihydroxy - 4 - pregnene - 3,20-dione

One hundred milliliters of two percent cornsteep liquor of sixty percent solids was adjusted to pH of 6.8 to 7.4 with sodium hydroxide and was sterilized at fifteen pounds pressure for thirty minutes. To this was added a similarly sterile solution of two grams of Cerelose (technical grade of dextrose) in four milliliters of water. This sterile medium was inoculated with a suspension of spores and mycelium of Streptomyces roseochromogenus (Waksman Collection 3689) and was agitated on a rotatory shaker for a period of 24 hours by which time a good growth of the organism had taken place. To this 24 hour culture, twenty milligrams of 6α-fluoro-11β-hydroxy-4-pregnene-3,20-dione dissolved in 0.2 milliliter of dimethylformamide was added. Incubation of the steroid with the microorganism was maintained (with agitation) for five days, at which time the pH was 8.6. The fermentation broth was then separated into the mycelium and the beer by centrifugation. The mycelium was extracted first with two 25-milliliter portions of acetone and then with four successive 25-milliliter portions of methyl isopropyl ketone. The beer was also extracted with four successive 25-milliliter portions of methyl isopropyl ketone. All of the extracts were combined, washed with two percent aqueous sodium bicarbonate solution and with water, dried with anhydrous sodium sulfate, and evaporated to dryness. The residue, which on paper chromatogram analysis showed the presence of 6α-fluoro-11β,16α-dihydroxy-4-pregnene-3,20-dione, was purified by chromatography over synthetic magnesium silicate (Florisil) and crystallization from acetone to give 6α-fluoro - 11β,16α - dihydroxy - 4 - pregnene - 3,20 - dione.

EXAMPLE 2

6α-fluoro-16α-hydroxy-4-pregnene-3,11,20-trione

In the same manner as given in Example 1, subjecting 6α-fluoro-4-pregnene-3,11,20-trione to the transforming action of Streptomyces roseochromogenus (Waksman Collection No. 3689) is productive of 6α-fluoro-16α-hydroxy-4-pregnene-3,11,20-trione.

EXAMPLE 3

6α-fluoro-11β,16α-dihydroxy-4-pregnene-3,20-dione 16-acetate

A solution of one gram of 6α-fluoro-11β,16α-dihydroxy-4-pregnene-3,20-dione in a mixture of five milliliters of pyridine and five milliliters of acetic anhydride is allowed to stand for eighteen hours at room temperature then is poured into a large volume of ice-water giving a precipitate of crude 6α-fluoro-11β,16α-dihydroxy-4-pregnene-3,20-dione 16-acetate. The thus obtained 16-acetate is purified by crystallization from acetone.

In the same manner as given above, treating 6α-fluoro-11β,16α-dihydroxy-4-pregnene-3,20-dione in pyridine solution with the acid anhydride, bromide, or chloride of an organic carboxylic acid, preferably a hydrocarbon carboxylic acid containing from one to twelve carbon atoms inclusive, is productive of the corresponding 16-esters, for example, 6α - fluoro - 11β,16α - dihydroxy - 4 - pregnene-3,20 - dione 16 - propionate, 6α - fluoro - 11β,16α - dihydroxy - 4 - pregnene - 3,20 - dione 16 - butyrate, 6α-fluoro - 11β,16α - dihydroxy - 4 - pregnene - 3,20 - dione, 16 - isobutyrate, 6α - fluoro - 11β,16α - dihydroxy - 4-pregnene - 3,20 - dione 16 - valerate, 6α - fluoro - 11β,16α-dihydroxy - 4 - pregnene - 3,20 - dione 16 - isovalerate, 6α - fluoro - 11β,16α - dihydroxy - 4 - pregnene - 3,20-dione 16 - trimethylacetate, 6α - fluoro - 11β,16α - dihydroxy - 4 - pregnene - 3,20 - dione 16 - (2 - methylbutyrate), 6α - fluoro - 11β,16α - dihydroxy - 4 - pregnene - 3,20 - dione 16 - (3 - ethylbutyrate), 6α - fluoro-11β,16α - dihydroxy - 4 - pregnene - 3,20- dione 16- hexanoate, 6α - fluoro - 11β,16α - dihydroxy - 4 - pregnene - 3,20 - dione 16 - diethylacetate, 6α - fluoro - 11β,16α - dihydroxy - 4 - pregnene - 3,20 - dione 16 - triethylacetate, 6α - fluoro - 11β,16α - dihydroxy - 4- pregnene-3,20 - dione 16 - heptanoate, 6α - fluoro - 11β,16α - dihydroxy - 4 - pregnene - 3,20 - dione 16 - octanoate, 6α-fluoro - 11β,16α - dihydroxy - 4 - pregnene - 3,20 - dione 16 - α - ethylisovalerate, 6α - fluoro - 11β,16α - dihydroxy - 4 - pregnene - 3,20 - dione 16 - hemisuccinate, 6α - fluoro - 11β,16α - dihydroxy - 4 - 3,20 - dione 16-cyclopropylideneacetate, 6α - fluoro - 11β,16α - dihydroxy-4 - pregnene - 3,20 - dione 16 - cyclopentylformate, 6α-fluoro - 11β,16α- dihydroxy - 4 - pregnene - 3,20 - dione 16 - cyclopentylacetate, 6α - fluoro - 11β,16α - dihydroxy-4 - pregnene - 3,20 - dione 16β - cyclohexylpropionate, 6α - fluoro - 11β,16α - dihydroxy - 4 - pregnene - 3,20-dione 16 - cyclohexylformate, 6α - fluoro - 11β,16α - dihydroxy - 4 - pregnene - 3,20 - dione 16 - cyclohexylacetate, 6α - fluoro - 11β,16α - dihydroxy - 4 - pregnene-3,20 - dione 16 - benzoate, 6α - fluoro - 11β,16α - dihydroxy - 4 - pregnene - 3,20 - dione 16 - (2 - methylbenzoate), 6α- fluoro - 11β,16α - dihydroxy - 4- pregnene-3,20 - dione 16 - (3 - methylbenzoate), 6α -fluoro - 11β,16α - dihydroxy - 4 - pregnene - 3,20 - dione 16 - (4-methylbenzoate), 6α- fluoro - 11β,16α - dihydroxy - 4- pregnene - 3,20- dione 16 - (2,3 - dimethylbenzoate), 6α - fluoro - 11β,16α - dihydroxy - 4 - pregnene - 3,20-dione 16 - (2,4 - dimethylbenzoate), 6α - fluoro - 11β,16α-dihydroxy - 4 - pregnene - 3,20 - dione 16 - (2,5 - dimethylbenzoate), 6α - fluoro - 11β, 16α - dihydroxy - 4-pregnene - 3,20 - dione 16 - (3,4 - dimethyl benzoate), 6α-fluoro - 11β,16α - dihydroxy - 4 - pregnene - 3,20 - dione 16 - (3,5 - dimethylbenzoate), 6α - fluoro - 11β,16α - dihydroxy - 4 - pregnene - 3,20 - dione 16 - (2,4,6 - trimethylbenzoate), 6α - fluoro - 11β,16α - dihydroxy - 4-pregnene - 3,20 - dione 16 - (2 - ethylbenzoate), 6α-fluoro - 11β,16α - dihydroxy - 4 - pregnene - 3,20 - dione 16 - (2,4,6 - triethylbenzoate), 6α - fluoro - 11β,16α - dihydroxy - 4 - pregnene - 3,20 - dione 16α - naphthoate, 6α - fluoro - 11β,16α - dihydroxy - 4 - pregnene - 3,20-dione 16 - (3 - methyl - α - naphthoate), 6α - fluoro-11β,16α - dihydroxy - 4 - pregnene - 3,20 - dione 16-phenylacetate, 6α - fluoro - 11β,16α - dihydroxy - 4-pregnene - 3,20 - dione 16 - phenylpropionate, 6α - fluoro-11β,16α - dihydroxy - 4 - pregnene - 3,20 - dione 16 - diphenylaceate, 6α - fluoro - 11β,16α - dihydroxy - 4 - pregnene - 3,20 - dione 16 - triphenylacetate, 6α - fluoro-11β,16α - dihydroxy - 4 - pregnene - 3,20 - dione 16-acrylate, 6α - fluoro - 11β,16α - dihydroxy - 4 - pregnene-3,20 - dione 16 - maleate, 6α - fluoro - 11β,16α - dihydroxy - 4 - pregnene - 3,20 - dione - 16 - vinylacetate, 6α - fluoro - 11β,16α - dihydroxy - 4 - pregnene - 3,20-dione - 16 - propiolate, 6α - fluoro - 11β,16α - dihydroxy-4 - pregnene - 3,20 - dione 16 - undecolate, 6α- fluoro-11β,16α - dihydroxy - 4 - pregnene - 3,20 - dione 16-glycinate, and the like.

EXAMPLE 4

*6α-fluoro-16α-hydroxy-4-pregnene-3,11,20-trione 16-acetate*

In the same manner as given in Example 3, treating 6α-fluoro - 16α - hydroxy - 4 - pregnene - 3,11,20 - trione with acetic anhydride and pyridine is productive of a 6α-fluoro - 16α - hydroxy - 4 - pregnene - 3,11,20 - trione 16-acetate.

Similarly, in the same manner as given in Example 3, treating 6α - fluoro - 16α - hydroxy - 4 - pregnene - 3,11, 20 - trione with an acid anhydride of an organic carboxylic acid, preferably a hydrocarbon carboxylic acid containing from one to twelve carbon atoms, inclusive, is productive of the corresponding 6α - fluoro - 16α-hydroxy - 4 - pregnene - 3,11,20 - trione 16 - acylate. The preferred 16-acylates are those corresponding to the acylates described above for 6α - fluoro - 11β,16α - dihydroxy - 4 - pregnene - 3,20 - dione.

It is to be understood that the invention is not to be limited to the exact details of operation or exact compounds shown and described, as obvious modifications and equivalents will be apparent to one skilled in the art; the invention is therefore to be limited only by the scope of the appended claims.

We claim:

1. A 16-oxygenated steroid of the formula:

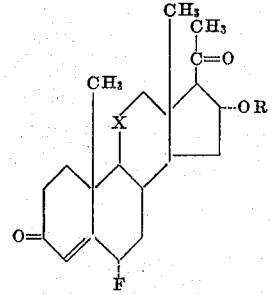

wherein X is selected from the group consisting of the carbonyl radical and the β-hydroxymethylene radical and R is selected from the group consisting of hydrogen and the acyl radical of a hydrocarbon carboxylic acid containing from one to twelve carbon atoms, inclusive.

2. 6α-fluoro-11β,16α-dihydroxyprogesterone.
3. 6α-fluoro-11β,16α-dihydroxyprogesterone 16-acetate.
4. 6α-fluoro-16α-hydroxy-11-ketoprogesterone.
5. 6α-fluoro-16α-hydroxy-11-ketoprogesterone acetate.

No references cited.